No. 774,165. Patented November 8, 1904.

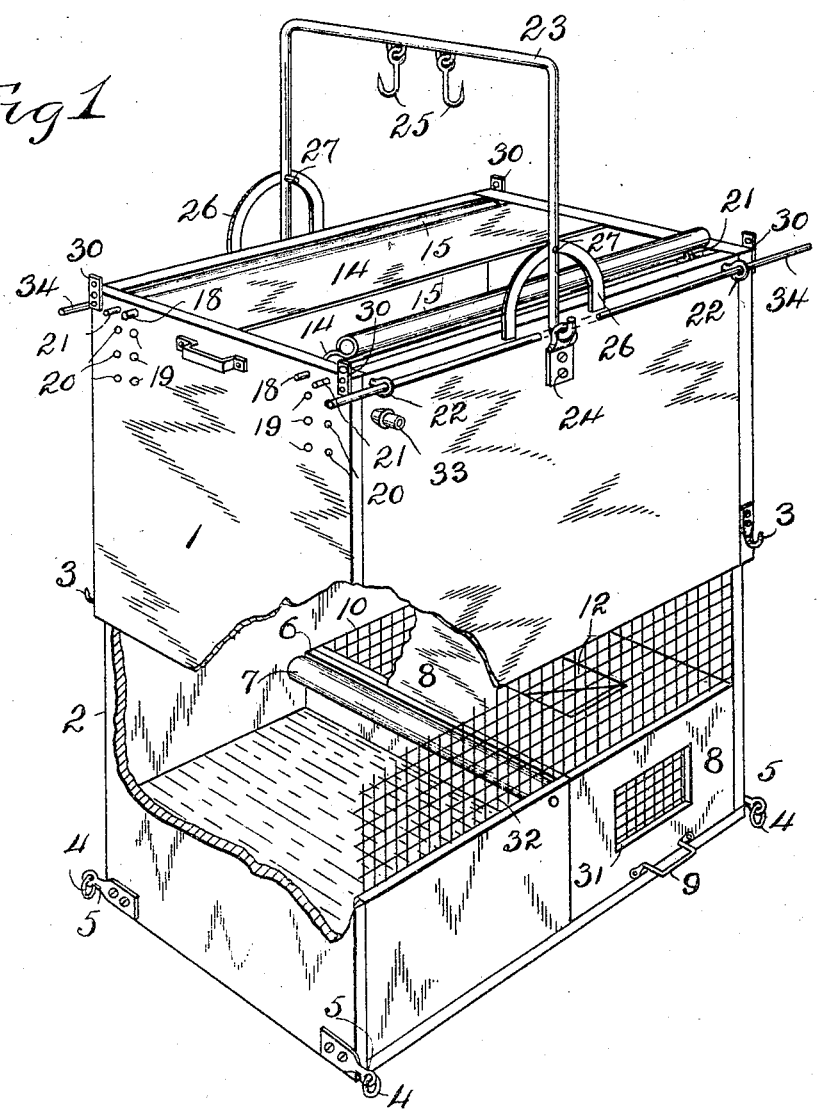

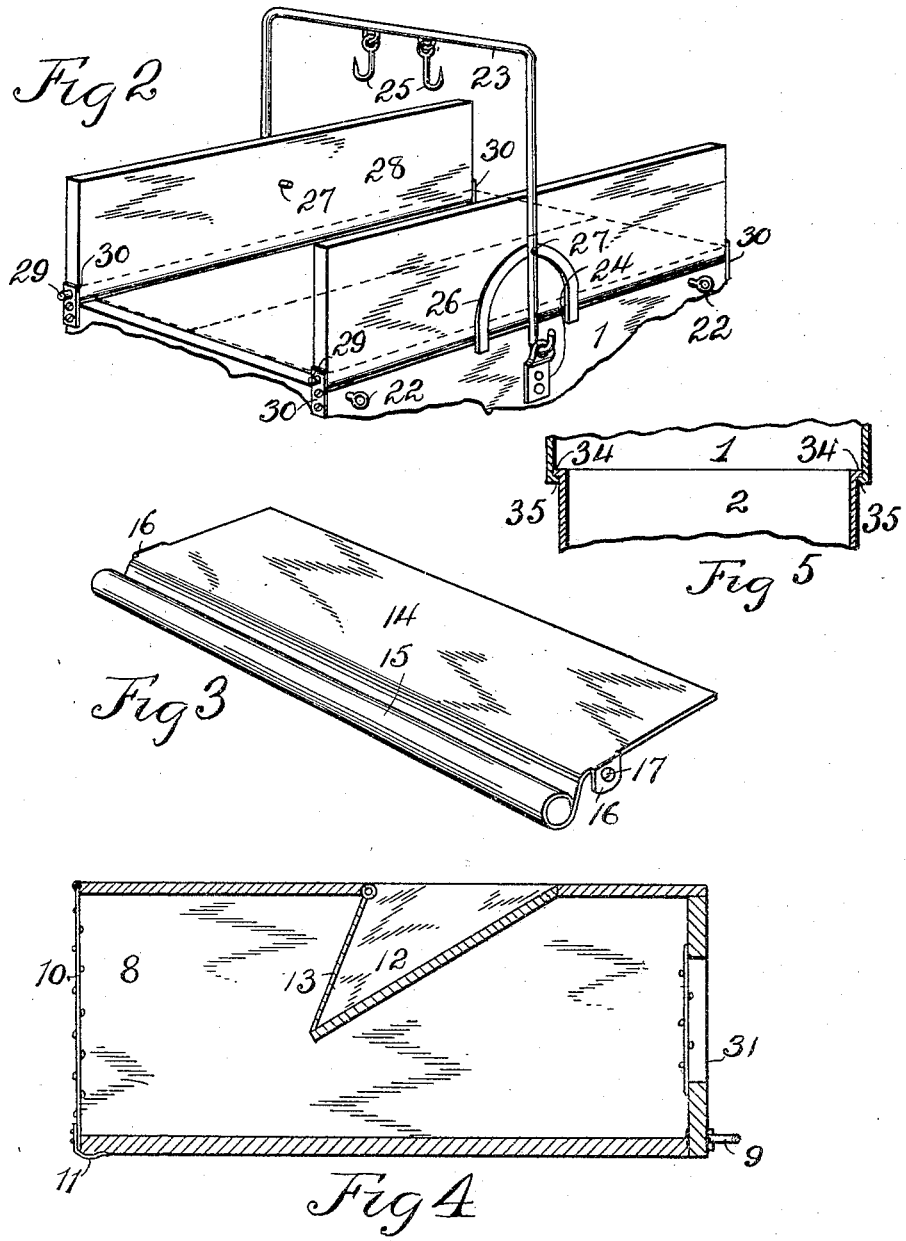

UNITED STATES PATENT OFFICE.

JOHN RIDDLE EMERY, OF NATIONAL MILITARY HOME, KANSAS.

ANIMAL-TRAP.

SPECIFICATION forming part of Letters Patent No. 774,165, dated November 8, 1904.

Application filed April 12, 1904. Serial No. 202,769. (No model.)

*To all whom it may concern:*

Be it known that I, JOHN RIDDLE EMERY, a citizen of the United States, residing at National Military Home, in the county of Leavenworth and State of Kansas, have invented new and useful Improvements in Animal-Traps, of which the following is a specification.

My invention relates to improvements in animal-traps.

The object of my invention is to provide a trap by means of which fowls and all kinds of animals may be readily caught and securely held.

My invention provides means by which the trap may be disposed so as to occupy small space to make it convenient for shipping, storing, or carrying from one place to another.

My invention provides a receptacle to receive the animals caught, the receptacle having an open top normally covered by a closure vertically adjustable in the receptacle and opened by the weight of an animal alighting thereon, thus precipitating the animal into the receptacle, the closure having automatic means for then causing it to assume the closed position.

In the form of my invention illustrated in the drawings the closure comprises gravity-actuated trap-doors from which the animals passing thereupon fall into the receptacle provided to hold them. In order to more easily capture certain kinds of animals, the trap-doors are made vertically adjustable, so that they may be disposed below the surface of the ground to the depth required for the particular kind of animal to be caught.

My invention provides, further, side guards for guiding the animals upon that portion of each trap-door upon which the animals will most quickly operate the door. The said guards are so pivoted to the animal-holding receptacle as to be swung when it is not desired to have the trap set to positions covering the trap-doors, thus preventing stock or persons falling into the trap.

Other novel features are hereinafter fully described, and set forth in the claims.

In the accompanying drawings, which illustrate my invention, Figure 1 is a perspective view of the trap, shown in the extended position, partly broken away, and with one door in the closed and the other door in the open position. In this view the side guards are omitted. Fig. 2 is a perspective view of the upper part of the receptacle having mounted thereon the side guards. Fig. 3 is a perspective view of one of the trap-doors. Fig. 4 is a longitudinal central vertical sectional view of the drawer. Fig. 5 is a vertical sectional view of the upper end of the lower and the lower end of the upper chamber, showing the flanges for retaining the two chambers together when in the extended position.

Similar characters of reference indicate similar parts.

The receptacle forming the body of the trap comprises two chambers 1 and 2, vertically slidable one inside the other. The upper chamber 1 has both upper and lower ends open, the inner or lower chamber having the lower end closed and the upper end open. The upper chamber 1 is provided at each outer corner, near its lower end, with a hook 3. In the upper ends of each corner of the chamber 2 is provided a screw-eye 5, having secured thereto a ring 4, adapted to engage the adjacent hook 3 when the two chambers are in the contracted position. To prevent the lower chamber falling out of the upper one when the chambers are extended, as shown in Fig. 1, the upper end of the chamber 2 is provided on its outer walls with horizontal flanges 34, adapted to rest upon similar flanges 35, provided on the inner walls of the chamber 1. A transverse vertical partition 6 extends upwardly from the bottom of the chamber 2 and forms therein, at one side of the partition, a water-reservoir. Adjacent the top of and parallel with the partition 6 is a horizontal roller 7, which revolves when a small animal, such as a rat or mole, tries to crawl over it from the water in the reservoir, thus dropping the animal back into the water. On the other side of the chamber 6 in the chamber 2 is slidably mounted a horizontally-movable drawer 8, having on its outer end a handle 9 and provided at its rear end with a door 10, hinged to the top of the drawer, which is closed. The lower end of the drawer-door 10 is provided with a spring-catch 11 for engaging with the bottom of the drawer. In the top of the drawer is provided an inlet-opening 12, having at its inner end a hinged gravity-actuated door 13, pivoted to the top of the drawer. This door will open inwardly and permit the ingress of an animal into the drawer, but will not open outwardly. Two trap doors 14, disposed parallel with each other and mounted horizontally in the receptacle at the upper end of the chamber 1, are normally positioned by gravity so as to close the open upper end of the chamber 1. I preferably make these trap-doors as shown in Fig. 3. At one side edge is formed a cylindrical barrel 15, which may be filled with lead or other material and the ends then closed. At each end near the barrel 15 is provided an ear 16, having a transverse hole 17, adapted to receive a horizontal bar 18, on which the door is pivoted. The barrel 15 is preferably disposed below the plane of the flat body portion of the door, so that when the door is deflected from a horizontal position by an animal falling through it will be swung to the normal horizontal position by the weight of the barrel 15 being at one side of a vertical plane passing through the pivotal points of the door. In the ends of the chamber 1 are provided a plurality of holes 19, disposed one above the other. The bars 18 may be placed horizontally in the upper, lower, or intermediate holes, as desired, thus varying the position of the doors 14 relative to the upper end of the chamber 1. Some animals will more readily walk upon the doors 14 when they are flush with the top of the box or near the top thereof, while others will more readily walk upon them when they are disposed below the top of the box. By vertically adjusting the doors they may be placed in a position best adapted for the particular kind of animal that it is desired to catch. To limit the movement of the doors so that when swinging to the horizontal position they will not pass such position, I provide two series of holes 20, adapted each to receive a pin 21, which when inserted in the proper one of the holes 20 will extend through the end of the chamber 1 and engage the under side of the adjacent door 14 on the side having the barrel 15. To change the position of a door 14, I remove the bar 18, on which it is mounted, lower the door, or raise it, as the case may be, and then reinsert the bar through the ears 16 when the door is properly positioned, and then withdraw and insert the pin 21 adjacent such door in the hole suitable for properly limiting the swing of the door.

On the outside of opposite sides of the chamber 1 are provided in each side two screw-eyes 22, adapted to receive therethrough a horizontal bar 34, the ends of which extend beyond the ends of the chamber and which serve to support the receptacle when it is lowered in a hole prepared to receive it. A bail 23 has its ends pivoted, respectively, in two ears 24, secured, respectively, to the outside of opposite sides of the chamber 1. This bail 23 is disposed above and transversely across the trap-doors 14 and has a central horizontal portion to which are secured one or more hooks 25, upon which meat or other bait may be placed. The hooks 25 are preferably disposed adjacent the middle of the bail, so as to cause the animal to approach the bait where the doors nearly meet. The bail is pivotally mounted, so as to be swung to a horizontal position when it is desired to catch birds or when it is desired to pack the trap for shipment. On each side of the chamber 1, adjacent the adjacent ear 24, is secured a vertical bracket 26, provided with a transverse hole adapted to receive a pin 27, which extends also through a corresponding hole provided in the adjacent leg of the bail. These pins and brackets releasably lock the bail in the vertical position.

To guide the animals into the trap at the proper place, I provide two side guards 28, which extend parallel with the doors 14 along the upper edges of the sides of the chamber 1, having affixed thereto the brackets 26. Near the lower edge of each guard 28 is provided a longitudinal hole in which is mounted a rod 29, the ends of which are mounted in transverse holes in the upper ends of the vertical ears 30, of which there are four, one near each upper corner of the chamber 1. In each guard is provided near its center a transverse hole adapted to receive therein the inner end of the adjacent pin 27. When so placed, the pins 27 hold the guards in the vertical position. By withdrawing the pins 27 the guards 28 may be swung to the horizontal position, (shown in dotted lines in Fig. 2,) thus covering the doors 14 and preventing persons or cattle falling into the trap. The guards 28 are also lowered when it is desired to lower the bail 23 and make a compact package of the trap.

The outer end of the drawer 8 may be provided with a hole 31, covered with wire-netting. One side of the chamber 2 may also have an opening along its length which is covered by the wire-netting 32. These openings permit the operator to examine the game caught within the drawer and in the chamber 2 outside the drawer.

Water may be placed in the reservoir in the casing 2 by pouring the water between the trap-doors 14, or a tube 33 may be provided in a transverse hole in the side of the chamber 1 and the water introduced into the reservoir through this pipe, the pipe being supplied in any desired manner with water.

In operating my invention a hole is dug of a size sufficient to receive the upper and lower chambers 1 and 2. The rings 4 are then released from the hooks 3 and the chambers lowered into the hole provided therefor, the upper chamber being supported by the rods 34, which have their ends resting upon the surface of the ground. The guards 28 and bail 23 are then swung to the vertical position (shown in Fig. 2) and the pins 27 inserted through the guards, the bail 23, and the brackets 26. Suitable bait is then suspended upon the hooks 25 and, if desired, water placed in the reservoir provided in the lower casing 2. The trap may then be left alone. The guards 28 will prevent the animals from approaching the bait excepting over the ends of the doors 14, which will swing by the weight of the animal stepping upon them and precipitate such animal into the interior of the receptacle, the doors immediately swinging back, by means of their weighted barrels 15, to the horizontal position, and thus preventing the escape of the animal through the top of the chamber 1. If the animal is small, it may fall into the water in the chamber 2, from which it cannot escape and in which it will eventually drown. It may also pass into the drawer 8 through the inlet 12, the door 13 falling after it and preventing its passage out of the drawer. It may afterward be removed from the trap by withdrawing the drawer and opening the door 10 at the end thereof. A bird alighting from the wing upon the doors 14 will be dropped into the trap in the same manner as described with reference to the trapping of other animals. If desired, the upper sides of the doors 14 may be strewn with grain or similar feed for the catching of fowls of any kind.

My trap is adapted to catch all kinds of animals, either with or without wings, and may be made to catch and hold animals of any size.

My invention may be modified in many ways without departing from its spirit.

Having thus described my invention, what I claim, and desire to secure by Letters Patent, is—

1. In an animal-trap, the combination with a receptacle provided with an open top, of a closure normally covering the said open top, vertically adjustable in the receptacle and opening inwardly by the weight of an animal thereupon.

2. In an animal-trap, the combination with a receptacle provided with an open top, of two parallel horizontal doors pivoted in the open top of the receptacle and normally closing the said open top, and provided with means for vertical adjustment in the receptacle.

3. In an animal-trap, the combination with a receptacle provided with an open top, of two parallel horizontal doors pivoted in said receptacle and normally held by gravity in a position closing said open top of the receptacle, and provided with means for being vertically adjusted in the receptacle.

4. In an animal-trap, the combination with a receptacle provided with an open top, of two parallel horizontal doors pivoted in the receptacle and normally held by gravity in a position closing said open top of the receptacle, a bail pivoted to said receptacle, provided with means for supporting thereon the bait, and means for locking releasably the said bail in a position disposed transversely across said receptacle and above said doors.

5. In an animal-trap, the combination with a receptacle provided with an open top, of two parallel horizontal vertically-adjustable doors pivoted in said receptacle and normally held by gravity in a position closing said open top of the receptacle, a bail pivoted to the receptacle and having means for suspending thereon the bait, and means for releasably locking the bail in a position disposed transversely across said receptacle and with the bait-supporting means above said doors.

6. In an animal-trap, the combination with a receptacle provided with an open top, of two doors pivoted in said receptacle and normally held by gravity in a horizontal position closing the open top of said receptacle, and two side guards disposed parallel with the doors and pivoted respectively to the receptacle and adapted to be swung from a vertical position outside said doors to a horizontal position covering said doors.

7. In an animal-trap, the combination with a receptacle provided with an open top, of two doors pivoted in said receptacle and normally held by gravity in a horizontal position closing the open top of the receptacle, two side guards disposed parallel to the doors and pivoted to the receptacle and adapted to be swung from a vertical position outside said doors to a horizontal position covering said doors, and means for releasably locking said guards in the vertical position.

8. In an animal-trap, the combination with a receptacle provided with an open top, of a bail pivoted to the receptacle and provided with means for supporting thereon the bait, two doors pivoted in said receptacle and normally held by gravity in a horizontal position closing said open top of the receptacle and under the bait-supporting means, two side guards disposed parallel to the doors and pivoted to the receptacle outside said doors respectively and adapted to be swung from a vertical position to a horizontal position covering said doors, and means for releasably locking said guards and said bail in a vertical position.

9. In an animal-trap, the combination with a receptacle provided with an open top, of a bail pivoted to said receptacle and having a bait-supporting means disposed over said open top when the bail is swung to the vertical position, two side guards pivotally mounted upon opposite sides of the receptacle and adapted to be swung from a vertical position to a horizontal position covering the open top of the receptacle, means for releasably locking the side guards and the bail together in the vertical position, two horizontal parallel doors provided with gravity-actuated means for swinging the doors to a position normally closing the open top of the receptacle, the doors being disposed under the bait-supporting means and parallel with and between the two side guards, and vertically-adjustable means for pivotally mounting the doors in the said receptacle.

10. In an animal-trap, the combination with a receptacle comprising an upper and a lower chamber vertically adjustable one inside the other, of releasable locking means for securing the two chambers together in the contracted position, and two horizontal parallel gravity-actuated doors pivotally mounted in and normally closing the upper end of the upper chamber.

11. In an animal-trap, the combination with a receptacle comprising an upper and lower chamber vertically adjustable one inside the other, of releasable means for locking the chambers together in the contracted position, and two gravity-actuated parallel doors vertically adjustable in and pivotally mounted upon said receptacle and normally positioned by gravity to close the upper end of said receptacle.

12. In an animal-trap, the combination with a receptacle comprising two chambers vertically adjustable one inside the other, of means for releasably locking the two chambers in the contracted position, supporting means for the upper chamber, two trap-doors pivotally mounted in the upper chamber and provided with gravity means for normally retaining the doors in position normally closing said top of the upper chamber, and a drawer in the lower chamber for removing the captured animals.

13. In an animal-trap, the combination with a receptacle comprising two telescoping chambers disposed one above the other, of releasable means for locking the two chambers together in the contracted position, two trap-doors pivotally mounted in the upper end of the upper chamber and provided with gravity-actuated means for forcing the trap-doors to a position closing the upper end of the upper chamber, a closed drawer in the lower chamber for removing therefrom captured animals, said drawer having an inlet-opening, and a gravity-actuated trap-door for closing said opening.

14. In an animal-trap, the combination with a receptacle provided with an open top, of two trap-doors pivoted to said receptacle, and provided with means for normally being positioned to close the open top, a transverse partition in the bottom of the receptacle forming at one side thereof a reservoir for water, a pivotally-mounted roller in the receptacle parallel with and adjacent to the upper end of said partition, a drawer in the receptacle on the other side of said partition, the drawer having an inlet-opening, and a gravity-actuated trap-door closing said inlet-opening.

15. In an animal-trap, the combination with a receptacle provided with an open top and having a transverse partition forming in the receptacle a water-receptacle, a roller disposed adjacent to and parallel with the top of said partition, and a drawer having an inlet and provided with a gravity-actuated door closing said opening, the drawer being disposed at one side of said partition, of two trap-drawers pivoted in and vertically adjustable in the receptacle and provided with gravity-actuated means for positioning the doors so that normally they close the open top of the receptacle, a bail disposed above and transversely across the said doors and having bait-supporting means, and two side guards disposed parallel with the doors and outside the doors respectively.

16. In an animal-trap, the combination with a receptacle comprising two chambers slidably mounted one in the other, of means for releasably locking together the two chambers in the contracted position, means for retaining the inner chamber from slipping out of the outer chamber, two trap-doors pivotally mounted in and normally closing one end of one chamber, and automatically-actuated means for swinging the doors to the closed position.

17. In an animal-trap the combination with a receptacle comprising two chambers slidably mounted one in the other, the upper end of the lower chamber and the upper and lower ends of the upper chamber being open, of means for releasably locking the two chambers together in the contracted position, means for preventing the slipping out of one chamber when the said locking means is released and the chambers are in the extended position, two trap-doors pivotally mounted in the upper chamber and vertically adjustable therein to different positions, means for automatically swinging the said trap-doors to a position normally closing the open upper end of the upper chamber, and means for suspending bait above said trap-doors.

18. In an animal-trap, the combination with a receptacle provided with an open top, of a closure normally covering said open top, vertically adjustable in the receptacle, and opening inwardly by the weight of an animal thereupon, and provided with automatic means for assuming the closed position when the weight of the animal is removed from the closure.

In testimony whereof I have signed my name to this specification in the presence of two subscribing witnesses.

JOHN RIDDLE EMERY.

Witnesses:
WARREN D. HOUSE,
HENRY F. ROSE.